Nov. 1, 1927.

T. J. LOFTUS 1,647,705

AUTOMATIC GOVERNING DEVICE FOR FLUID DISPLACEMENT METERS

Filed Dec. 1, 1926 2 Sheets-Sheet 1

INVENTOR.
Thomas J. Loftus.
BY Townsend Loftus & Abbett
ATTORNEYS.

Nov. 1, 1927.                                                           1,647,705
                         T. J. LOFTUS
          AUTOMATIC GOVERNING DEVICE FOR FLUID DISPLACEMENT METERS
                    Filed Dec. 1, 1926              2 Sheets-Sheet 2
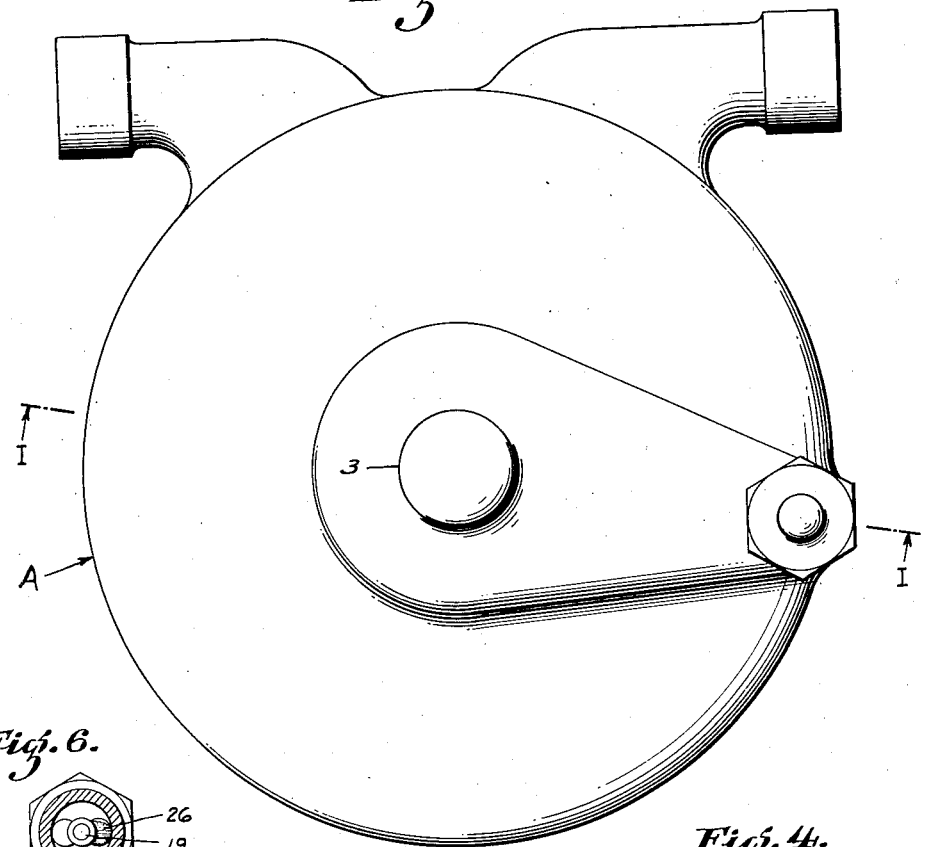
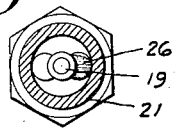
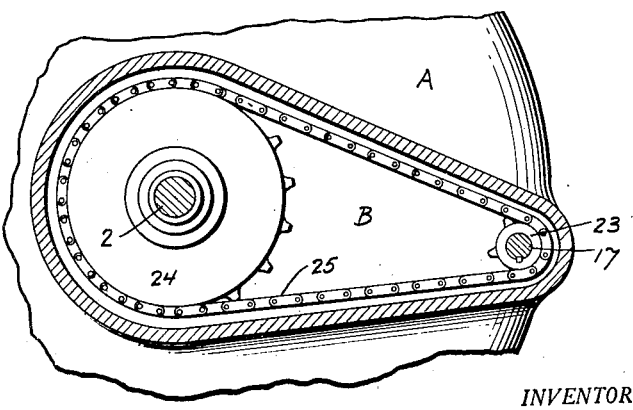
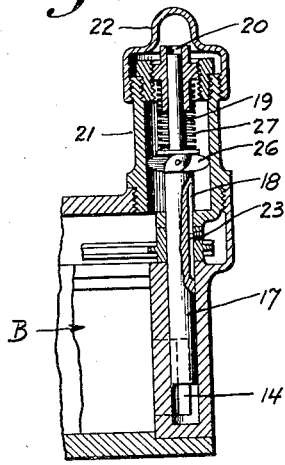
INVENTOR.
Thomas J. Loftus.
BY Townsend Loftus & Abbott
ATTORNEYS.

Patented Nov. 1, 1927.

1,647,705

UNITED STATES PATENT OFFICE.

THOMAS J. LOFTUS, OF POLLOCK, CALIFORNIA, ASSIGNOR OF ONE-HALF TO HARMON BELL, OF OAKLAND, CALIFORNIA.

AUTOMATIC GOVERNING DEVICE FOR FLUID-DISPLACEMENT METERS.

Application filed December 1, 1926. Serial No. 151,863.

This invention relates to an automatic governing device for fluid displacement meters and particularly to an improvement or modification of the structure shown in my co-pending application, entitled "Automatic governing device for fluid displacement meters", filed October 7, 1925, Serial Number 60,977.

The structure disclosed in my co-pending application above referred to, is especially intended for metering purposes; for instance in the oil industry where metering and dispensing of gasoline and like products in measured quantities is desired. The meter disclosed consists of a housing having an inlet and a discharge connection formed thereon; a rotor is mounted within the housing between the inlet and the discharge connection and measuring pockets are formed in the rotor. Actual practice has proven that a certain amount of leakage takes place through the metering mechanism. The leakage loss encountered is greatest at slow speeds of the rotor and proportionately less at higher speeds. This leakage loss was automatically compensated for in my co-pending application by increasing or decreasing the amount of liquid delivered to the measuring pockets.

The fluid displacement meter disclosed in the present application consists of a housing having an inlet and a discharge connection formed thereon and it is provided with a rotor disposed between the inlet and outlet connection and said rotor is provided with measuring pockets. Leakage loss is also encountered with the present form of structure, but compensation for the leakage loss is taken care of in a different manner from that disclosed in my co-pending application. In the present instance, the measuring pockets are so proportioned that for each revolution of the rotor, a given quantity of liquid will be discharged. When the rotor is turning at slow speed the leakage loss is the greatest and if the capacity of the measuring pockets is so proportioned that the total quantity discharged by the pockets plus the leakage loss gives the desired final discharge then no compensating device will be required. It, however, happens that meters of this character are manually operated and that the measuring device is, accordingly, rotated at different speeds. If the measuring device is operated at a certain slow speed no compensation will be required, as already stated, as the correct amount will be discharged, but if the measuring device should be rotated at a greater speed, the leakage loss would be smaller in proportion to the volume of liquid measure and the quantity finally discharged would be slightly under measurement.

The present invention, accordingly, embodies an automatically actuated valve whereby predetermined quantities of liquid are by-passed from the inlet to the discharge side, this valve being automatically opened to a greater extent so as to by-pass a greater quantity of liquid when the meter is operating at a high speed and the valve is so regulated that it will proportionately close and diminish the amount of liquid by-passed as the speed decreases and when a predetermined slow speed is reached the valve will be completely closed as the leakage loss plus the amount discharged by the measuring pockets will then cause the correct amount of liquid to be discharged. The invention is shown by way of illustration in the accompanying drawings in which:

Figure 3 is a side elevation of the meter,

Figure 4 is a section taken on the line IV—IV of Figure 1,

Figure 5 is a section similar to Figure 1 to show the compensating valve in a partially opened position, Figure 6 is a cross section taken on the line VI—VI of Figure 1.

Figure 1:
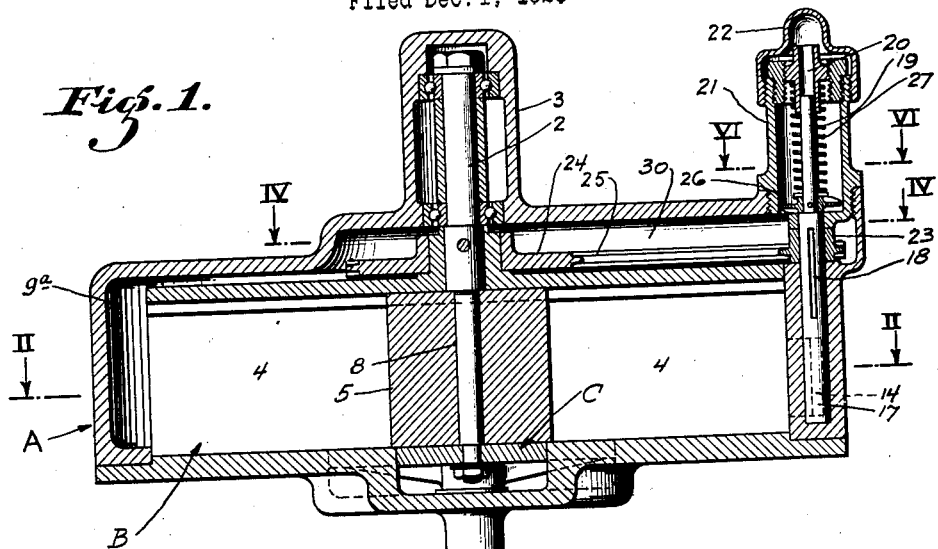
Figure 1 is a cross section in plan view taken on the line I—I of Figure 3.
Figure 2:
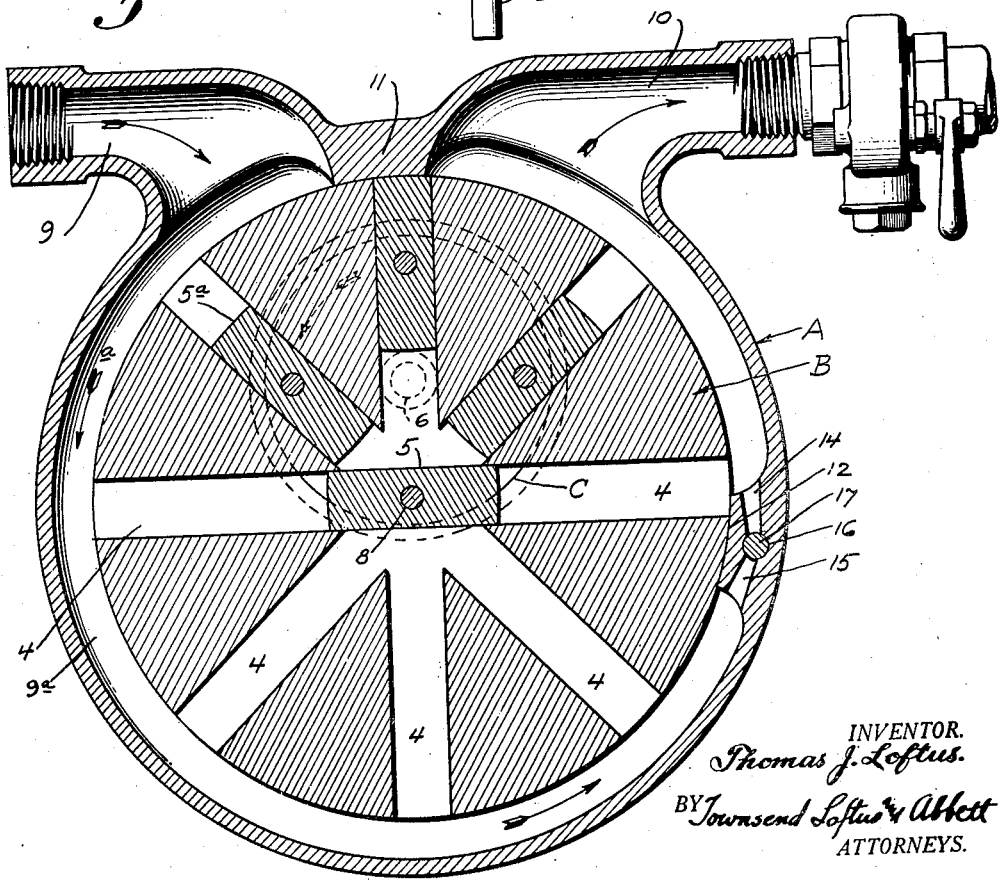
Figure 2 is a vertical central section taken on the line II—II of Figure 1.

The type of meter illustrated in the present instance is substantially identical to the type of meter illustrated in my co-pending application already referred to. Preferably it consists of a cylindrical-shaped casing A interior of which is mounted a rotor B. This rotor is secured to and supported by a shaft 2 which is journaled in an end bearing 3 formed in one side of the casing. The rotor proper is radially slotted as indicated at 4. These slots extend from the periphery to the center of the rotor and the center portions are in communication with each other as shown in Figure 2. These slots are filled with liquid during rotation of the rotor and as such will be referred to as measuring pockets.

Slidably mounted in the slots or measuring pockets are pistons 5 which serve two functions. First that of imparting rotary motion to the rotor and secondly that of expelling or discharging liquid delivered to the measuring pockets. The pistons are carried by a second rotor generally indicated at C which is carried by a shaft 6 journaled in a bearing 7 formed in the opposite side of the casing. The shaft 6 and the rotor C are eccentrically positioned with relation to the rotor B and the rotor C is provided with a series of pins 8 which carry the pistons 5 and upon which they are pivotally mounted.

There are eight slots in the rotor and there are half as many pistons as there are slots. The number of pistons and slots employed may, however, be increased or decreased as desired, as long as the multiple of two is maintained. In view of the fact that the second rotor C is eccentrically positioned with relation to the main rotor B, it is necessary that the pins 8 which carry the pistons 5 be so positioned with relation to the center of the rotor that the center of the pins will pass through the center line of the rotor during the turning movement of the metering mechanism.

The liquid to be metered or measured, for instance, gasoline, is transmitted to the casing A through an inlet connection generally indicated at 9 and it is delivered under a slight pressure, say for instance, a pressure which is sufficient to drive the rotors; the pressure actually required being slightly in excess of one pound gauge per square inch. The liquid entering the connection 9 fills an annular space generally indicated at $9^a$ and it also fills the measuring pockets indicated at 4. The liquid, under pressure, at the same time, exerts a force on the outer ends of the pistons indicated at 5 and $5^a$ and the force thus applied causes rotation of the two rotors and transfer of the liquid from one side of the casing to the other where a discharge connection 10 is provided. There are two abutments within the casing, an upper abutment such as indicated at 11 and a lower abutment as indicated at 12. These abutments, together with the rotor and the piston separate the inlet connection from the discharge connection and the only liquid which can be transferred from one side of the casing to the other is that which enters the measuring pockets and is discharged therefrom. There is, of course, a small leakage loss from one side of the casing to the other, but this will be later referred to.

In actual practice, it has been found that when the meter is operating under fairly low pressure and when the speed of rotation is comparatively slow that leakage of gasoline or other fluid will take place around the pistons and around the sides and ends of the rotors, and as such will enter the discharge connection 10 without being metered. This leakage loss is greatest in proportion to the volume of liquid measured when the speed of rotation is slow and is proportionately less when the speed of rotation increases. The leakage loss under a given pressure or head is substantially the same for each unit of time, and while the leakage increases with an increase in the pressure or head, the speed of the rotor increases in much greater proportion than the increase in the leakage, so that the loss in leakage in proportion to the volume of liquid measure decreases as the speed increases. It is, accordingly, necessary to take the leakage loss into consideration and to provide means for automatically compensating therefor. This is accomplished as follows:

For the purpose of description, it will be assumed that the capacity of the measuring pockets is such that $\frac{15}{16}$ths of a gallon of liquid will be transferred from one side of the casing to the other during one revolution of the rotor and it will also be assumed that the leakage loss, when the meter rotates at a predetermined slow speed, will amount to $\frac{1}{16}$th of a gallon during one revolution. The net result will, accordingly, be the discharge of one gallon or the correct amount desired. If the speed of rotation is increased, as often happens, $\frac{15}{16}$ths of a gallon will be discharged each revolution, but the leakage loss will be less than $\frac{1}{16}$th of a gallon, that is, the leakage loss is substantially constant per unit of time and if the leakage loss is $\frac{1}{16}$th of a gallon when the rotor travels at a certain predetermined slow speed and the speed of the rotor is doubled, the leakage loss per revolution would merely be $\frac{1}{32}$nd of a gallon, hence each gallon discharged at the increased speed would lack $\frac{1}{32}$nd of a gallon and the correct amount would not be delivered. In the present instance, an automatic governing mechanism has been provided whereby a certain amount of liquid may be by-passed to make up for the discrepancy in measurement as the speed increases. The by-pass is formed in the abutment indicated at 12. It consists of two aligned ports 14 and 15 and an intermediate cylindrical chamber 16 in which is mounted a piston valve 17. This piston valve is automatically raised when the speed of the rotor increases and as such uncovers the ports 14 and 15, thereby permitting a small amount of liquid to by-pass. The amount of port area uncovered depends upon the speed. That is, at high speeds the ports may be totally uncovered and at slower speeds they may be partially uncovered, while at predetermined slow speed they would be wholly covered as the leakage loss at the predetermined slow speed together with the liquid discharged by the measuring pockets would give the correct quantity required.

Means are employed for automatically raising and lowering the piston valve 17 to cover or uncover the ports 14 and 15. This means or mechanism is best illustrated in Figures 1, 4, 5 and 6. The mechanism is constructed and operated as follows:—The piston valve 17 is provided with a key or feather 18 on its upper end and it is also provided with a reduced stem or extension 19 which projects into a guide bearing 20 formed within an auxiliary housing or extension indicated at 21 which is closed by means of a cap 22. Mounted on the keyed end of the piston valve is a sprocket gear 23. Similarly mounted on the shaft 2 or on the hub of the rotor is a sprocket gear 24 and connecting the two sprocket gears is a driving chain 25. Pinned or otherwise secured on the extension 19 of the piston valve is a propeller 26 and interposed between the propeller and the guide bearing 20 is a helical tension spring 27 which may be adjusted to exert any pressure desired by means of the bearing 20 which is screw-threaded on its exterior to permit vertical adjustment.

In actual operation, when the liquid, under pressure, enters the connection 9 it imparts a rotary motion to the rotors. The liquid in the chamber 8 is also under pressure and this chamber communicates with a side chamber 30 and with the auxiliary housing 21. In other words, the housing 21 and the auxiliary chamber 30 are both filled with liquid under pressure, and as the rotor is rotated by the liquid under pressure, rotary motion will be transmitted to the sprocket 24 and through the chain drive 25 to the sprocket 23. This will, in turn, rotate the piston valve and the propeller 26. If the speed of rotation is slow or below or at a predetermined speed heretofore referred to, the parts 17, 23 and 26 will merely rotate without imparting any longitudinal movement to the piston vale. On the other hand if the speed of the rotor increases, the propeller will begin to climb vertically within the auxiliary housing 21 and as it is pinned to the piston valve, it is obvious that the valve will move or raise in unison with the same and that the ports 14 and 15 will become uncovered so that a certain proportion of liquid may be by-passed. If the speed is further increased the propeller will tend to climb to a greater elevation and the ports 14 and 15 will be further uncovered. At maximum speed they will be completely uncovered and at minimum or a predetermined speed referred to, they will be completely covered as the propeller and piston valve will then automatically lower to normal or closed position. The by-pass of the liquid, when required, is thus automatically regulated and controlled and the proper amount of liquid by-passed may be regulated by increasing or decreasing the tension of the spring 27. It should also be noted that the rotor rotates in the direction of arrow A (see Figure 2), this being directly opposite to the direction of rotation of the device shown in my co-pending application. This reversing of the direction of rotation has also been found advantageous as it leaves a small proportion of unbalanced area as far as the rotor is concerned and it, furthermore, reduces pulsating effects in the discharging stream.

While certain features of the present invention are more or less specifically described, I wish it understood that various changes may be resorted to within the scope of the appended claims. Similarly that the materials and finishes of the several parts employed may be such as the manufacturer may decide or varying conditions or uses may demand.

Having thus described my invention, what I claim and desire to secure by Letters Patent is:—

1. A variable speed and discharge fluid meter, comprising a housing, a rotatable measuring member mounted within the housing and adapted to discharge a predetermined quantity of fluid at each revolution, a fluid by-pass mechanism, and a connection between the rotary-measuring member and the fluid by-pass mechanism whereby the quantity of liquid by-passed is automatically increased when the speed of the measuring member is increased and automatically decreased when the speed of the measuring member is decreased.

2. A variable speed and discharge fluid meter comprising a housing, said housing having an inlet and a discharge connection formed thereon, a rotatable measuring member mounted within the housing between the inlet and the discharge connection, said measuring member being adapted to discharge a predetermined quantity of fluid at each revolution, said housing also having a by-pass passage formed therein whereby fluid may be by-passed from the inlet to the discharge connection, a valve operable in said by-pass passage, and means connected with and actuated by the rotatable measuring member for automatically changing the position of the valve to increase the quantity of liquid by-passed when the speed of the member is increased and to decrease the quantity of liquid by-passed when the speed of the measuring member is decreased.

3. A variable speed and discharge fluid meter, comprising a housing, said housing having an inlet and a discharge connection formed thereon, a rotatable measuring member mounted within the housing between the inlet and the discharge connection, said measuring member adapted to discharge a predetermined quantity of fluid each revolution, said housing also having a by-pass passage formed therein whereby the fluid may be by-passed from the inlet to the discharge connection, a valve operable in said by-pass, a governor, a driving connection between the governor and the rotating measuring member, and a connection between the governor and the valve whereby the valve is raised to increase the quantity of fluid by-passed when the speed of the measuring member and the governor is increased and whereby the valve is lowered to decrease the quantity of liquid by-passed when the speed of the rotating measuring member and governor is decreased.

4. In a metering mechanism of the character described, a housing having a by-pass passage formed therein, a rotor in the housing, a piston valve in the by-pass passage adapted to open and close the by-pass passage, a propeller connected with the piston valve, a driving connection between the rotor and the propeller, means for surrounding and maintaining the propeller submerged in a liquid, and a connection between the propeller and the piston valve whereby longitudinal movement is imparted thereto.

5. In a metering mechanism of the character described, a housing having a by-pass passage formed therein, a rotor in the housing, a piston valve in the by-pass passage adapted to open and close the by-pass passage, a propeller connected with the piston valve, a driving connection between the rotor and the propeller, means for surrounding and maintaining the propeller submerged in a liquid, a connection between the propeller and the piston valve whereby longitudinal movement is imparted thereto, and an adjustable spring tension device for resisting said longitudinal movement.

6. In a metering mechanism of the character described, a housing having a by-pass passage formed therein, a rotor in the housing, a valve movable longitudinally in the by-pass passage and adapted to open and close the by-pass passage, a propeller connected with the valve, a driving connection between the rotor and the propeller, means for surrounding and maintaining the propeller submerged in a liquid and a connection between the propeller and the valve whereby longitudinal movement is imparted thereto.

THOMAS J. LOFTUS.